US007952596B2

(12) United States Patent
Thörn

(10) Patent No.: US 7,952,596 B2
(45) Date of Patent: May 31, 2011

(54) ELECTRONIC DEVICES THAT PAN/ZOOM DISPLAYED SUB-AREA WITHIN VIDEO FRAMES IN RESPONSE TO MOVEMENT THEREIN

(75) Inventor: Karl Ola Thörn, Malmö (SE)

(73) Assignee: Sony Ericsson Mobile Communications AB (SE)

( * ) Notice: Subject to any disclaimer, the term of this patent is extended or adjusted under 35 U.S.C. 154(b) by 734 days.

(21) Appl. No.: 12/029,030

(22) Filed: Feb. 11, 2008

(65) Prior Publication Data

US 2009/0201313 A1      Aug. 13, 2009

(51) Int. Cl.
*G09G 5/00* (2006.01)
*G06F 3/00* (2006.01)
(52) U.S. Cl. .................... 345/660; 345/671; 715/755
(58) Field of Classification Search .................. 345/660, 345/671; 715/755
See application file for complete search history.

(56) References Cited

U.S. PATENT DOCUMENTS

| | | | | | |
|---|---|---|---|---|---|
| 5,021,772 | A | * | 6/1991 | King et al. | 345/632 |
| 5,473,369 | A | * | 12/1995 | Abe | 348/169 |
| 7,009,626 | B2 | * | 3/2006 | Anwar | 345/660 |
| 2004/0008773 | A1 | * | 1/2004 | Itokawa | 375/240.08 |
| 2004/0017938 | A1 | * | 1/2004 | Cooper et al. | 382/171 |
| 2004/0119819 | A1 | * | 6/2004 | Aggarwal et al. | 348/143 |
| 2006/0193538 | A1 | * | 8/2006 | Vronay et al. | 382/305 |
| 2007/0070037 | A1 | * | 3/2007 | Yoon | 345/156 |
| 2008/0212878 | A1 | * | 9/2008 | Itokawa | 382/190 |
| 2009/0034800 | A1 | * | 2/2009 | Vau et al. | 382/107 |

FOREIGN PATENT DOCUMENTS

| EP | 1 184 810 A2 | 3/2002 |
|---|---|---|
| WO | WO 00/00933 A1 | 1/2000 |
| WO | WO 2004/066615 A1 | 8/2004 |

OTHER PUBLICATIONS

Chen et al. "A visual attention model for adapting images on small displays" *Multimedia Systems* 9:353-364 (2004).
Notification of Transmittal of the International Search Report and the Written Opinion of the International Searching Authority, or the Declaration, International Search Report, Written Opinion of the International Searching Authority, PCT/EP2008/060608, Nov. 3, 2008.

* cited by examiner

*Primary Examiner* — Ryan R Yang
(74) *Attorney, Agent, or Firm* — Myers Bigel Sibley & Sajovec, PA

(57) ABSTRACT

An electronic device can include a display and a controller. The controller identifies a location within a displayable area of video frames which has movement, and controls panning/zooming of a sub-area within the video frames that is displayed on the display in response to the identified location of the movement. Some configurations of the controller detect movement of a person's mouth within the video frames while the person is speaking, identifies the associated location of the person speaking, identifies characteristics of voice in the video frames that is concurrently occurring with the detected movement of the person's mouth, and correlates the identified voice characteristics with the identified location of the person speaking. The controller then detects subsequent occurrence of voice in the video frames having the identified voice characteristics of the person and, responsive thereto, pans a sub-area within the video frames displayed on the display toward the identified location of the person and/or zooms-in to increase size of the person speaking by decreasing size of a sub-area within the video frames at the location of the speaker that is fit to the display.

13 Claims, 4 Drawing Sheets

ELECTRONIC DEVICES THAT PAN/ZOOM DISPLAYED SUB-AREA WITHIN VIDEO FRAMES IN RESPONSE TO MOVEMENT THEREIN

FIELD OF THE INVENTION

The present invention generally relates to the field of electronic devices such as wireless communication terminals, and more particularly to apparatus and methods that control the display of video on electronic devices.

BACKGROUND OF THE INVENTION

Electronic devices, such as wireless communication terminals and other portable electronic devices, have evolved to include increasingly more functionality. For example, some wireless communication terminals have sufficient capacity to store and then play-back full-length movies. Additionally or alternatively, some wireless communication terminals have sufficient communication bandwidth to allow users to download and view streaming video, such as a movie and/or a video-conference, across a wireless communication network.

Commercial success of such portable electronic devices may be hindered by their relatively small display size. Movies are generally composed with an expectation that they will be displayed on large screens, such as on movie theater screens or televisions. Moreover, wide use of high-definition televisions by consumers may have increased consumers' expectation of what is acceptable viewability of movies. Unfortunately, when movies are played on the relatively small displays of portable electronic devices, some features within the movies may be unacceptably difficult to view, which may lead to decreased acceptability of such devices. Accordingly, providing effective movie viewing or other video viewing through electronic devices, such as portable electronic devices, continues to be a challenge.

SUMMARY OF THE INVENTION

In some embodiments, an electronic device includes a display and a controller. The controller is configured to identify a location within a displayable area of video frames which has movement, and to control panning/zooming of a sub-area within the video frames that is displayed on the display in response to the identified location of the movement.

In some further embodiments, the controller is further configured to identify the location of a person moving in the video frames, and to pan/zoom the displayed sub-area within the video frames in response to the identified location of the person moving.

In some further embodiments, the controller is further configured to pan the displayed sub-area within a video frame to increase an amount of the person that is viewable on the display in response to the controller determining that a further portion of the person is outside the displayed sub-area but contained elsewhere within the video frame.

In some further embodiments, the controller is further configured to zoom-in to enlarge the displayed size of the person's face in a displayed sub-area within the video frames in response to identifying movement of the person's face.

In some further embodiments, the electronic device further includes a frame buffer that temporarily buffers streaming video frames received by the electronic device from a data network for a sufficient time for the controller to carry-out the pan/zoom within the associated buffered video frames.

In some further embodiments, the controller is further configured to detect movement of the person's mouth in the video frames and, responsive thereto, to identify the associated location of the person, and to pan/zoom the displayed sub-area within the video frames in response to the identified location of the person speaking.

In some further embodiments, the controller is further configured to identify characteristics of voice accompanying the video frames that is concurrently occurring with the detected movement of the person's mouth, and to correlate the identified voice characteristics with the identified location of the person.

In some further embodiments, the controller is further configured to detect occurrence of voice in the video frames having the identified voice characteristics of the person and, responsive thereto, to pan the displayed sub-area within the video frames toward the identified location of the person.

In some further embodiments, the controller is further configured to detect occurrence of voice in the video frames having the identified voice characteristics of the person and, responsive thereto, to zoom-in to decrease size of a displayed sub-area within the video frames at the identified location of the person and thereby enlarge the displayed person.

In some further embodiments, the controller is further configured, after zooming-in, to gradually zoom-out to display increasingly larger sub-areas of the video frames at the location of the person to thereby shrink the displayed person.

In some further embodiments, the controller is further configured to gradually zoom-out to display increasingly larger sub-areas of the video frames at the location of the person until another person who the controller has identified as having previously spoke and who is also concurrently contained within the video frames is also displayed.

In some further embodiments, the controller is further configured, after zooming-in, to zoom-out to display a larger sub-area or an entire area of the video frames in response to detecting a voice in the video frames that does not correspond to a previously identified person who spoke in the displayed sub-area within the video frames.

In some further embodiments, the controller is further configured, after zooming-in, to zoom-out to display a larger sub-area or an entire area of the video frames in response to detecting substantial change in content between at least one of the present video frames and at least one later occurring video frame.

In some further embodiments, the controller is further configured to enlarge a sub-area within one of the video frames at a previously identified location of movement in adjacent video-frames to create a displayable thumbnail picture in response to a user of the electronic device commanding stop or pause in the display of the video frames.

In some further embodiments, the electronic device further includes a memory containing the video frames, wherein the controller is further configured to discard from the memory at least a substantial portion of data of the video frames that is outside the sub-area within the video frames to be displayed while retaining in the memory data of the video frames that is inside the sub-area within the video frames to be displayed.

In some further embodiments, the controller is further configured to determine direction of the movement within the video frames, and to pan the displayed sub-area within the video frames in the determined direction of the movement.

In some further embodiments, the controller is further configured to determine speed of the movement in the direction within the video frames, and to regulate speed at which the displayed sub-area is panned in the direction of the movement in response to the determined speed of the movement.

In some further embodiments, the controller is further configured to determine a relative size of a person's face contained within a scene of the video frames, and to adjust size of the displayed sub-area within the video frames in response to the determined relative size of the person's face.

Some other embodiments are directed to an electronic device that includes a wireless transceiver, a display, and a controller. The wireless transceiver is configured to receive video frames streaming across a wireless network. The controller detects movement of a person's mouth within the video frames while the person is speaking, identifies the associated location of the person speaking, identifies characteristics of voice in the video frames that is concurrently occurring with the detected movement of the person's mouth, and correlates the identified voice characteristics with the identified location of the person speaking. The controller then detects subsequent occurrence of voice in the video frames having the identified voice characteristics of the person and, responsive thereto, pans a sub-area within the video frames displayed on the display toward the identified location of the person and/or zooms-in to increase size of the person speaking by decreasing size of a sub-area within the video frames at the location of the speaker that is fit to the display.

Some other embodiments are directed to a method of displaying video frames on an electronic device. The method includes identifying a location within a displayable area of video frames which has movement, and controlling panning and/or zooming location of a sub-area within the video frames that is displayed on a display in response to the identified location of the movement.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Figure 1:
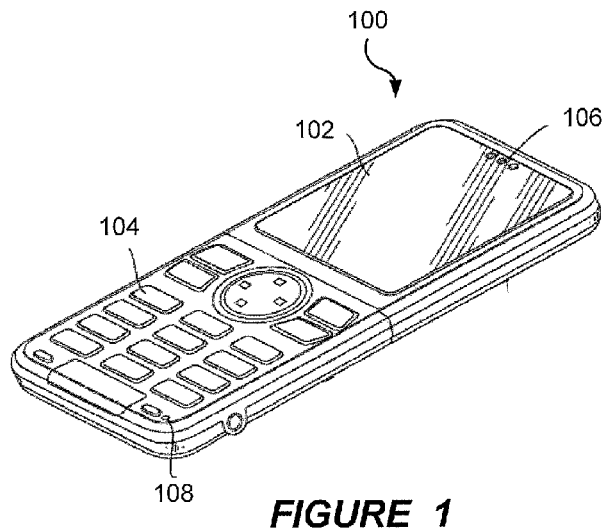
FIG. 1 is a perspective view of a wireless communication terminal that is configured to control the display of video thereon in accordance with some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Embodiments of the present invention are applicable to any type of electronic device that can control the display of video frames on a display. The operations described herein for editing video frames by panning/zooming therein responsive to movement and other attributes can be carried out in electronic devices that can include, but are not limited to, mobile communication terminals, media players, laptop computers, gaming consoles and devices, vehicle navigation devices, and computer servers. For purposes of illustration and explanation only, various embodiments of the present invention are described herein in the context of mobile communication terminals (communication terminals). These communication terminals can be configured to carry out cellular communications (e.g., cellular voice and/or data communications) and/or short range communications (e.g., wireless local area network and/or Bluetooth).

FIG. 1 is a plan view of a wireless communication terminal 100 that is configured to control the display of video frames thereon in accordance with some embodiments of the present invention. The terminal 100 includes a display 102, a keypad 104, and a speaker 106 and a microphone 108 which are both located behind a front surface of the terminal 100. The terminal 100 is configured to display video frames on the display 102. As used herein, "video frames" refers to video information, and can further include audio information, for movies, video conferencing, and/or other video sources that is processed to generate video information for display on the display 102 and, when included, audio information to be played through the speaker 106. Some non-limiting examples of video frames include full-length movies that are contained in memory within the terminal 100 and/or which are downloaded as streaming video across a wireless communication interface from, for example, a cellular network and/or a wireless local area network (WLAN) and associated Internet. Other non-limiting examples of video frames include video conference data that is received by the terminal 100 from a remote videoconference device.

As shown in FIG. 1, the terminal 100 is relatively compact to enhance its portability. As a result, the display area of the display 102 is relatively small. When movies or other video sources have been composed for viewing on much larger displays, such as at movie theaters or wide-format high-definition televisions, their display on the display 102 may, without use of various embodiments herein, result in people or other objects being displayed unacceptably small. For example, people's faces may be rendered unrecognizable and/or voices may be heard without sufficient visual cues to provide an understanding as to who among a group of displayed people is speaking.

However, according to some embodiments of the present invention, the terminal 100 is configured to automatically zoom-in, zoom-out, and/or pan a sub-area within the video frames that is displayed on the display 102 so as to improve the viewability of the content of the video frames. More particularly, the terminal 100 can identify a location within a displayable area of the video frames where movement has certain defined characteristics, such as characteristic movement of a person's mouth while speaking. The terminal 100 can respond thereto by panning/zooming a displayed sub-area within the video frames toward the identified location. The panning/zooming may be carried out by instantly changing the displayed sub-area to a target area in the video frames, or it may be carried out more gradually so that a user observes smooth changes to the displayed sub-area (e.g., panning the sub-area by gradually sliding the displayed window within a scene in some defined direction).

Figure 2A:
FIGS. 2A-E illustrate control of panning and zooming of sub-areas of video frames that are displayed on a display, such as on the display of FIG. 1, according to some embodiments of the present invention.

Various further exemplary embodiments are now described with regard to FIGS. 2A-E which illustrate how the terminal 100 automatically controls panning and zooming for sub-areas of exemplary video frames that are displayed on the display 102. Referring initially to FIG. 2A, an exemplary scene within the video frames appears to show a meeting among six persons. The terminal 100 may initially automatically scale the displayed scene responsive to the horizontal and vertical resolution (i.e., line/pixel resolution) of the video frames and/or aspect ratio (e.g., 4:3 letterbox ratio, 16:9 widescreen ratio) and the resolution of the display 102, so that video frames are fit to the display area of the display 102 according to user-defined and/or preset rules.

The terminal 100 can detect movement having defined characteristics within the video frames and, responsive thereto, can automatically zoom-in/zoom-out and/or pan a sub-area within the video frames that fills the display 102 when displayed.

Figure 2B:
Figure 2C:

By way of example, the terminal 100 determines that a first person 200 (shown third from left in FIG. 2A) is speaking, such as by detecting movement of the person's 200 mouth. In response to that detection, the terminal 100 automatically zooms-in to enlarge the displayed size of the person's 200 face, as shown in FIG. 2B. The terminal 100 then detects that a second person 202 (shown on the far right and FIG. 2A) is speaking and is not presently within the displayed sub-area within FIG. 2B and, responsive thereto, automatically pans the sub-area within the video frames toward the second person 202 so that the second person is shown zoomed-in (enlarged) on the display 102, as shown in FIG. 2C.

Figure 2D:
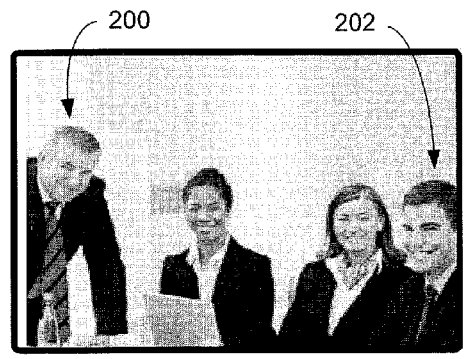
Figure 2E:

The terminal 100 then detects that the first person 200 is again speaking and, responsive thereto, automatically zooms-out and pans the sub-area within the video frames so that both the first person 200 and the second person 202 are simultaneously included within the displayed sub-area within the video frames, as shown in FIG. 2D. As shown in FIG. 2D, the terminal 100 zoomed-out the sub-area within the video frames to show a smaller image of the persons so as to simultaneous display the first and second persons 200 and 202. The terminal 100 then automatically zooms-out, as shown in FIG. 2E, so as to show a larger sub-area or an entire area the video frames in response to various defined events. These and other aspects of embodiments of the present invention will now be further described below with regard to FIGS. 3-11.

As described above and as will be further described below, the terminal 100 automatically controls panning and zooming for sub-areas of video frames that are displayed on the display 102. As used herein, "automatically" refers to operations that are carried out by the terminal 100 without human intervention. Thus, for example, the operations for zooming and panning displayed sub-areas of the video frames, such as described above with regard to FIGS. 2A-D and which will be described below with regard to FIGS. 3-11, are carried out dynamically by the terminal 100 without intervention by a human operator (e.g. by a user of the terminal 100).

Figure 3:
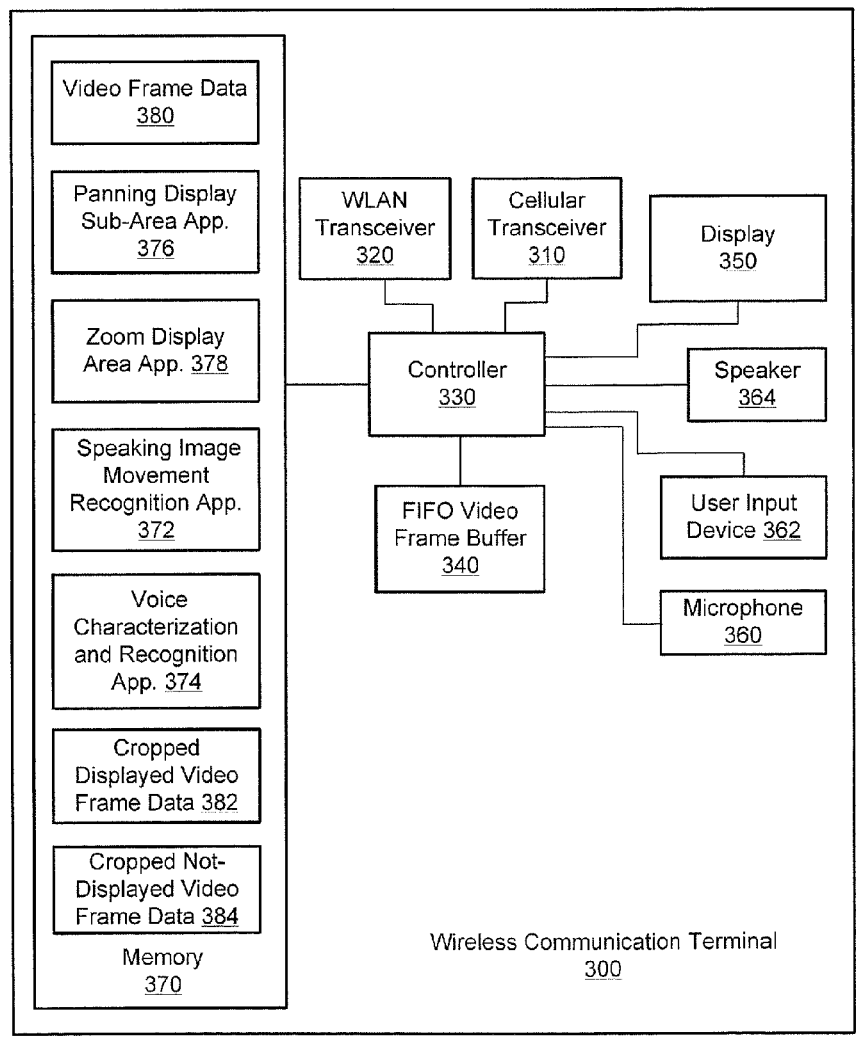
FIG. 3 is a schematic block diagram of a wireless communication terminal, such as the terminal of FIG. 1, which is configured to operate according to some embodiments of the present invention.

FIG. 3 is a schematic block diagram of electronic circuits for a wireless communication terminal 300 which are configured to operate according to some embodiments of the present invention, and which may be included within the terminal 100 of FIG. 1. Referring to FIG. 3, the terminal 300 can include a cellular transceiver 310 that can communicate with a plurality of cellular base stations each of which provides cellular communications within their respective cells. The cellular transceiver 310 can be configured to encode/decode and control communications according to one or more cellular protocols, which may include, but are not limited to, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The terminal 300 may alternatively or additionally communicate via the WLAN (e.g., IEEE 802.11b-g)/Bluetooth transceiver 320 and a proximately located WLAN router/Bluetooth device connected to a network, such as the Internet. The terminal 300 can further include a controller circuit 330, a video frame buffer 340, a display 350 (e.g., display 102 of FIG. 1), a microphone 360 (e.g., microphone 108 of FIG. 1), a user input device 362 (e.g., keyboard 104, touch-screen interface), a speaker 364 (e.g., speaker 106 of FIG. 1), and a program/data memory 270.

The program memory 370 includes computer program code that, when carried out by the controller 330, is configured to carry-out various functionality described herein. Computer program code applications contained within the program memory 370 can include, an application 372 that recognizes movement in the video frames that is characteristic of a person speaking, an application 374 that characterizes voice occurring in the audio portion of the video frames and which then later recognizes occurrence of that voice, an application 376 that controls panning of a displayed sub-area within the video frames, an application 378 that controls zooming in/out the displayed sub-area of the video frames. The program memory 370 can also include data areas 380 that store unedited video information, other data areas 382 that store video information that has been cropped to show less than the entire video frame and which will be displayed on the display 102, and still other data areas 384 that store cropped video information that is outside the sub-area that can be displayed on the display 102.

It is to be understood that although the exemplary wireless terminal 300 has been illustrated with various separately defined elements for ease of illustration and discussion, the invention is not limited thereto. Instead, various functionality described herein in separate functional elements may be combined within a single functional element and, vice versa, functionally described herein in single functional elements can be carried out by a plurality of separate functional elements.

The controller 330 is configured to control the display of video frames on the display 350. The video frames may be contained within a full-length movie resident in the memory 370, such as in area 380, and/or may be generated from streaming video that is received through the cellular transceiver 310 via a cellular network and/or through the WLAN transceiver 320 via a WLAN and associated Internet. Streaming video that is received through one or both of the transceivers 310 in 320 can be temporarily buffered in the video frame buffer 340 for a sufficient time for the controller 330 to carryout at least some of the pan-zoom operations in the buffered video frames before the edited video frames are displayed on the display 350. There may therefore be a processing time delay between receipt of streaming video frames into the video frame buffer 340 and playing of corresponding edited video frames from the buffer 340 onto the display 350.

Accordingly, at least some of the exemplary operations may be carried out on streaming video that is temporarily buffered in the video frame buffer 340 to generate edited video frames, which can be cropped by zooming-in and/or panning sub-areas that are to be displayed.

Alternatively or additionally, at least some of the exemplary operations may be carried out in the background on video frames that are stored in the memory, such as within the video frame data area 380, to generate edited video frames that can be stored in the cropped data area 382. After the movie has been edited, the edited video can be played by the controller 330 through the display 350 and the speaker 364. While editing a movie, the controller 330 may discard from the memory 370 at least a substantial portion of data that is outside the sub-area of the video frames that is be subsequently displayed, while retaining in the memory area 382 data that is inside the sub-area of the video frame says be displayed. Alternatively, while editing a movie, the controller 330 may store the data that is outside the sub-area of the video frames that is to be subsequently displayed within a memory area 384.

Accordingly, a user may download a high-resolution movie into the memory area 380, where the resolution of the movie is substantially beyond the capabilities of the display 350 but which the user wants to maintain because of the user's intent to also view the movie in its full resolution on a high-definition television. Because the high-resolution movie contains many more pixels in each video frame than are capable of being displayed on the display 350, the controller 330 can edit the video frames of the high-resolution movie from data area 380 to generate cropped video frame data that it stores in area 382 for later viewing on the display 350 without noticeable loss of clarity to the user. Moreover, as described herein, the controller 330 can automatically crop the video frames of the high-resolution movie by controlling zooming and/or panning locations of a sub-area within the video frames that will be retained for display on the display 350.

Figure 4:
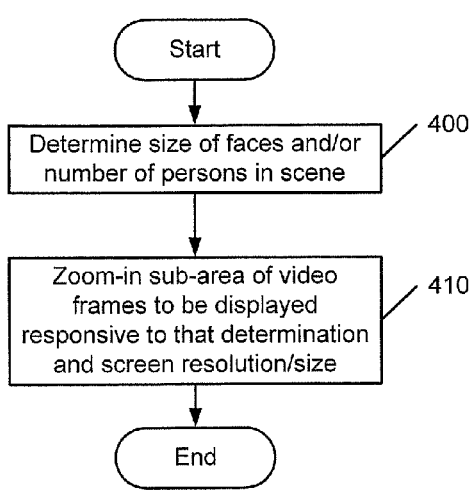
FIG. 4 is a flowchart illustrating operations for zooming-in/out a sub-area within video frames that is displayed responsive to size of faces and/or number of persons in a scene in accordance with some embodiments of the present invention.

Various operations that can be carried out by the controller 330 in response to the applications in the memory 370 are now described with regard to FIGS. 4-11. FIG. 4 is a flowchart that illustrates operations that can be carried-out by the controller 330 executing the application 378 to control zooming responsive to the size of faces and/or the number of persons in a scene. The controller 330 can determine (Block 400) the relative size of one or more faces in a scene contained in the video frames and/or can determine (Block 400) how many persons are contained within the scene. In response to the determination, the controller 330 can automatically zoom-in (Block 410) to stretch a sub-area within the video frames to fill the display 102 in response to the relative size of one or more faces therein and/or how many persons are contained within the scene. For example, the terminal 100 may automatically zoom-in to enlarge faces shown in a displayed sub-area so that the faces are displayed at least at a threshold size and/or terminal 100 may automatically zoom-in to crop the displayed area around a defined number of persons identified therein. Thus, the scene shown in FIG. 2A may include additional scene content that is beyond the borders of display 102, but which, after zooming-in, is not displayed because of a program rule to enlarge faces of the people within the scene and/or a program rule to crop the scene closely around the number of persons contained in the scene.

Figure 5:
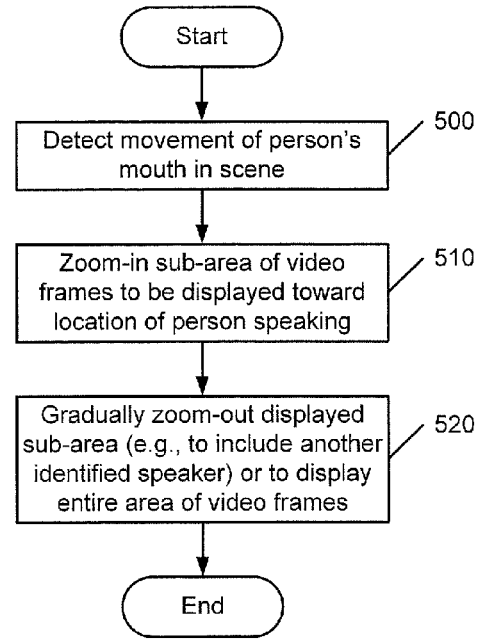
FIG. 5 is a flowchart illustrating operations for zooming-in the sub-area within video frames that is displayed toward a location of person speaking and then zooming-out the displayed area in accordance with some embodiments of the present invention.

FIG. 5 is a flowchart illustrating operations that can be carried out by the controller 330, via the applications 372 and 378, to zoom the displayed sub-area within video frames toward detected movement within the scene, such as movement of a person's mouth. The controller 330 can detect (Block 500) within video frames characteristic movement of a person's mouth while talking (e.g., identify movement of a mouth shape at a typical speech rate) and can identify a location of that person within the video frames. In response to that detection, the controller 330 can zoom-in (Block 510) to crop the displayed area toward the location within the video frames of the person who is talking, thereby enlarging the displayed person talking. For example, as shown in FIG. 2B, the terminal 100 detects that the first person's 200 mouth is moving in a characteristic speaking pattern and, responsive thereto, automatically zooms-in to enlarge the displayed size of the person's 200 face.

After zooming-in, the controller 330 may gradually zoom-out (Block 520) to display increasingly larger sub-areas of the video frames until another person who the controller has previously identified as a speaker and who is concurrently contained within the video frames is also displayed. Accordingly, after quickly zooming-in (which may be perceived by a user as occurring instantaneously) on the first person 200, such as shown in FIG. 2B, the controller 330 may more gradually zoom-out to show at least some more people or to show the entire content of the video frames, such as the scene shown in FIG. 2A.

Figure 6:
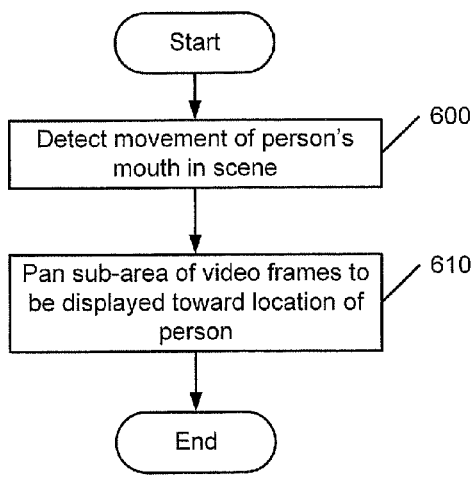
FIG. 6 is a flowchart illustrating operations for panning the sub-area within video frames that is displayed toward detected movement, such as movement of a person's mouth, within a scene in accordance with some embodiments of the present invention.

FIG. 6 is a flowchart illustrating operations that can be carried out by the controller 330, via the applications 372 and 376, to pan the displayed sub-area within video frames toward a person who is identified as speaking. In a similar manner to the operations of Block 500, the controller 330 can detect (Block 600) within video frames characteristic movement of a person's mouth while talking and can identify a location of that person within the video frames. In response to that detection, the controller 330 can pan (Block 610) the displayed sub-area toward the location of the person who is talking to cause that person to be included within the displayed scene.

For example, while displaying the scene shown in FIG. 2B, the controller 330 detects movement of the second person's 202 mouth and determines that, although the second person 202 is contained within the video frames, the second person 200 to is not presently displayed on the display 102. In response to the determination, the controller 330 automatically pans the displayed sub-area toward the second person 202 so that the second person 202 is displayed on the display 102, as shown in FIG. 2C.

The controller 330 can combine such zooming and panning operations (e.g., applications 372, 376, and 378) to dynamically adjust the size and location of the displayed sub-area within the video frames so as to closely crop the displayed area around a plurality of people who appear to be having a conversation. For example, while displaying the scene shown in FIG. 2C, the controller 330 can detect that the first person 200 is speaking again, by detecting characteristic movement of the first person's 200 mouth. In response to the determination, the controller 330 can zoom-out a sub-area and pan toward the first person 200 so that both the first person 200 and the second person 202 are simultaneously shown on the display 102. In this manner, the controller 330 can be configured to correlate when two or more persons within a scene are sequentially speaking close in time or are simultaneously speaking, thereby identifying persons having a conversation, and can respond thereto by adjusting the displayed sub-area within the video frames to be closely cropped around those speakers.

Figure 7:
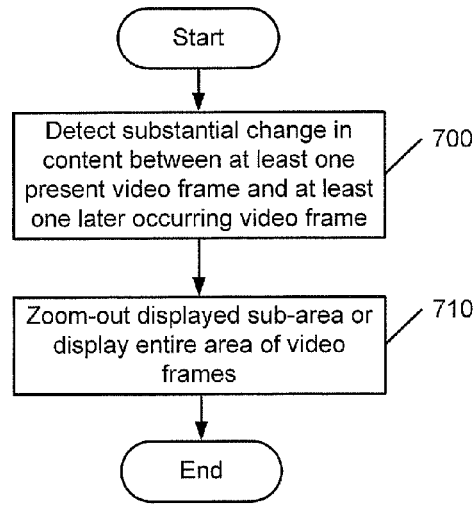
FIG. 7 is a flowchart illustrating operations for zooming-out the area of video frames that is displayed responsive to substantial change in content of video frames in accordance with some embodiments of the present invention.

FIG. 7 is a flowchart illustrating operations that can be carried out by the controller 330, via the operations of application 382, to zoom-out in response to scene changes or other substantial changes in the content of the video frames. For example, the controller 330 can detect (Block 700) a substantial change in the content between at least one video frame and at least one later occurring video frame and, responsive thereto, can zoom-out (Block 710) the displayed sub-area within the video frames to display the entire area of the video frames. For example, while displaying the scene of FIG. 2D, the controller 330 can detect a substantial change in content of a subsequently occurring video frame, such as what may be caused by movement by a third person 204 (e.g., the third person 204 moving to stand up) or by introduction of an entirely new scene content. In response thereto, the controller 330 can zoom-out the displayed sub-area to further include display of the third person 204 while maintaining at least some cropping of the video frames, such as shown in FIG. 2E, or can completely zoom-out to display the entire area the video frames, such as shown in FIG. 2A.

It is to be understood that although various embodiments are described in the context of controlling zooming and panning of a displayed sub-area within video frames in response to detecting mouth movement that is indicative of people speaking, the invention is not limited thereto. For example, the controller 330 can control zooming and/or panning of a displayed sub-area within video frames in response to detecting other defined movements. The controller 330 can detect turning of a person's head or movement of an object within a scene, such as movement of a car, and can respond thereto by panning the displayed sub-area in a direction that the person's head has turned and/or in a direction that the object is moving (so as to display more of the scene of the video frames in the direction that the person is looking or that the object is moving).

Moreover, the controller 330 can select a rate of panning and/or rate of zooming-in/out the sub-area based on the speed at which movement is detected to be occurring within the video frames. When, for example, the controller 330 detects slow movement of a person's head, the controller 330 can respond by automatically panning the displayed sub-area in the direction that the head is turning to look, and may further zoom-out the sub-area to show a larger area of the video frames in that direction. By further example, in response to detecting slow movement of a car traveling from the right to the left of the video frames, the controller 330 can respond by slowly panning the displayed sub-area from the right to the left. In contrast, the controller 330 can respond to detecting fast movement of a car by more quickly panning the displayed sub-area in the direction that the car is moving and/or by zooming-out more quickly the sub-area to show a larger area or the entire area of the video frames.

When the video frames are downloaded as streaming video or as a non-real time file from a network server, the described panning and/or zooming operations may be carried out by the network server independent of the wireless terminal 300 or under the control of the wireless terminal 300. For example, the controller 330 may command the network server to pan/zoom within a movie scene to regulate what sub-area of the video frames is downloaded to the wireless terminal 300 (e.g., via the cellular transceiver 310/WLAN transceiver 320) for display. Alternatively or additionally, the network server and/or the wireless terminal 300 may regulate what camera angles of a movie are displayed in response to detected movement or other such detected characteristics. For example, when a movie contains video frames from multiple camera angles, the controller 330 may command the display of one camera angle over another in response to sensing movement that would be most viewable on the display 350 by the selected camera angle.

Figure 8:
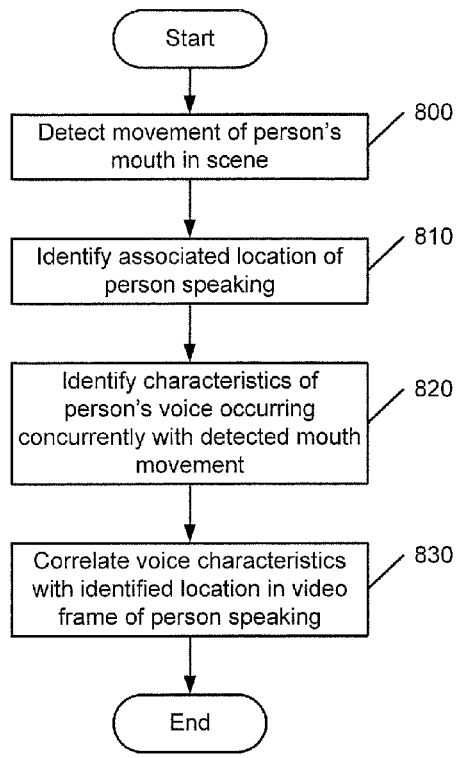
FIG. 8 is a flowchart illustrating operations for detecting movement of a person's mouth in scene, identifying location of the person speaking, identifying characteristics of the person's voice, and correlating voice characteristics to the location of the person in accordance with some embodiments of the present invention.
Figure 9:
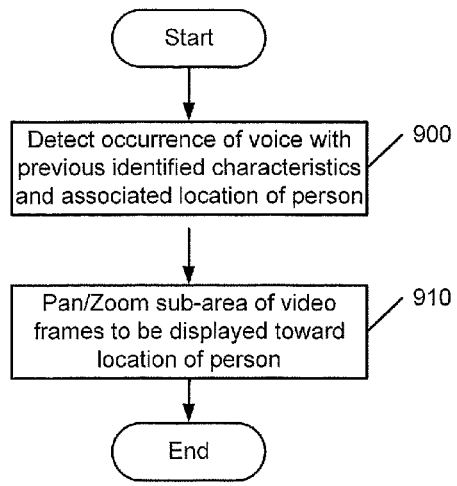
FIG. 9 is a flowchart illustrating operations for panning/zooming a sub-area within video frames that is to be displayed toward a known location of a person associated with detected voice in accordance with some embodiments of the present invention.
Figure 10:
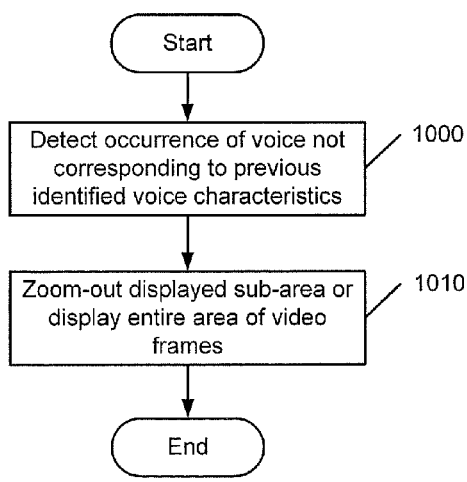
FIG. 10 is a flowchart illustrating operations for zooming-out the area of video frames that is displayed responsive to detecting voice that does not correspond to a previously identified voice in accordance with some embodiments of the present invention.

In some further exemplary embodiments of FIGS. 8-10, the controller 330 is configured to correlate a person's voice characteristics with where that person is located within a scene of the video frames, and control panning/zooming so as to display that person when that person's voice is detected.

FIG. 8 is a flowchart illustrating operations that can be carried out by the controller 330, via the applications 372 and 374, to detect movement of a person's mouth in a scene, to identify a location of the person speaking, to identify characteristics of the person's voice, and to correlate those voice characteristics to a location of the person. The controller 330 can detect (Block 800) movement of a person's mouth in a scene in the manner described above with regard to Block 500 of FIG. 5. The controller 330 can further identify (Block 810) the location of the speaker within the scene. The controller 330 also identifies (Block 820) characteristics of the person's voice that is detected occurring concurrently with the detected mouth movement, and correlates (Block 830) those voice characteristics with the identified location of the speaker. To reduce the processing throughput and memory that is used to characterize and then recognize a person's voice, the controller 330 can predominately characterize voice based on measurements of a person's time-averaged speech pattern or, even less demanding, based on time averaged voice pitch and/or speech rate. Accordingly, the voice characterization and recognition may in some embodiments, for purpose of processor and/or memory efficiency, be directed to primarily distinguishing between men's versus women's voices and/or between children versus adult voices to enable efficient identification and panning/zooming between locations of various different age and/or gender persons with a scene.

FIG. 9 is a flowchart illustrating operations that can be carried out by the controller 330, via the applications 376 and 378, to pan/zoom the sub-area within the video frames that is displayed toward the known location of a person associated with the detected voice. The controller 330 detects (Block 900) occurrence of voice that corresponds to previously identify characteristics of the speaker. The controller 330 responds (Block 910) thereto and a further determination that the person speaking is not presently shown in the displayed sub-area, by panning the displayed sub-area within the video frames toward the known location of the person corresponding to the identified voice and/or by zooming-out the sub-area so as to show the identified person speaking.

With further reference to FIG. 2B, after identifying that the first person 200 is speaking (Block 800), the location of the first person 200 is recorded (Block 810) and characteristics of the first person's 200 voice are identified (Block 820). The first person's identified voice characteristics are correlated (Block 830) to the identified location in the video frame of the first person. When the first person 200 starts talking again while the sub-area shown in FIG. 2C is displayed, the controller 330 detects (Block 900) the occurrence of the first person's voice and further determines that the first person 200 is not contained within the displayed sub-area. The controller 330 responds (Block 910) thereto by panning the displayed sub-area within the video frames toward the known location of the identified speaker and by slightly zooming-out the displayed sub-area so as to display the first person 200 and the second person 202. Accordingly, because the first and second persons are sequentially speaking close in time to one another, they are presumed to be carrying-out a conversation and, responsive thereto, the controller 330 adjusts the displayed sub-area so that the scene is closely cropped to an area that includes the first and second persons 200 and 202.

FIG. 10 is a flowchart illustrating operations that can be carried out by the controller 330 to zoom-out the displayed sub-area within video frames in response to detecting voice that does not correspond to a previously identified voice. The controller 330 can detect (Block 1000) occurrence of a voice that does not correspond to previously identified voice characteristics and which does not correspond to a person within the displayed sub-area who is speaking. In response thereto, the controller 230 zooms-out (Block 1010) the displayed sub-area or displays an entire area of the video frames. Accordingly, when a third person 204 begins talking while the scene shown in FIG. 2D is displayed, the controller 330 determines that the third person's 204 voice does not correspond to any known person within the scene. The controller 330 further detects that the third person 204 is contained within the video frames but outside of the displayed scene and, responds thereto, by zooming-out the displayed sub-area to include display of the third person 204, as shown in FIG. 2E.

Accordingly, the controller 330 is configured to automatically transition from showing the entire video frames to zooming in on the first speaker 200, then automatically panning to display the second speaker 202, then automatically panning and zooming out to show both the first and second speakers 200 and 202 in response to recognizing the voice of the first speaker 200, and then further automatically zooming-out to display the third speaker 204 whose voice is recognized as a yet another voice. By using a combination of movement detection and recognition of the people's voice, the controller 330 may more accurately identify who within a scene is speaking and may thereby more accurately control panning and/or zooming within a scene to display the person speaking. For example, while movement of a person's mouth may be accurately detected when scenes in the video frames contain a close-up of the person's face, later scenes may show the person much more further away where detecting movement of the person's mouth may become much less accurate and reliance on identification of the person's voice can improve identification of that person as a present speaker in a scene. Moreover, the controller 330 may analyze a sound track associated with the video frames to identify or assist with identifying a direction for panning/zooming. For example, the controller 330 can be configured to analyze a surround-sound type soundtrack to identify a direction from which a loud sound, voice, or other defined characteristic sound originated and, in response thereto, to carry-out panning/zooming in that direction.

The controller 330 can be configured to display on the display 102 a small "thumbnail" snapshot picture of a video frame in response to a user commanding the terminal 100 to stop or pause video display. The thumbnail picture may be displayed on the display 350 to enable a user to visually determine where a movie or other video was stopped/paused and from where it can therefore be resumed. Because the thumbnail picture is generated as a much smaller displayable representation of the video, without editing using embodiments herein it may be rendered unrecognizable to a user. To increase the viewability of the thumbnail picture, the controller 330 is configured to generate the thumbnail picture as an enlarged view of a location within a video frame where a speaker has been previously identified and/or where other movement has been detected.

Figure 11:
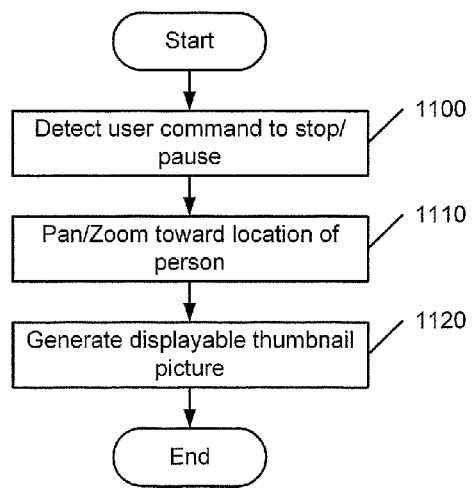
FIG. 11 is a flowchart illustrating operations for generating a displayable thumbnail picture of a video frame that is panned/zoomed toward a location of a person in response to detecting a stop/pause user command in accordance with some embodiments of the present invention.

FIG. 11 is a flowchart illustrating operations for generating a displayable thumbnail picture of a video frame that is panned/zoomed toward a location of an identified speaker in response to detecting a stop/pause user command. The controller 330 detects (Block 1100) a user command (e.g. via the input device 362) to stop/pause display of the video frames. The controller 330 responds by panning/zooming (Block 1110) within a video frame toward a location of an identified speaker to generate (Block 1120) a displayable thumbnail picture. The thumbnail picture can be displayed on the display 350 to provide a visual representation to the user of where a movie was stopped/paused. The thumbnail picture may alternatively or additionally be generated more dynamically in response to panning/zooming carried-out within the frames without restriction to whether a user has paused/stopped playing the video frames.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An electronic device comprising:
a display; and
a controller configured to identify a location of a person moving within a displayable area of video frames, to detect movement of the person's mouth in the video frames and, responsive thereto, to identify the associated location of the person, and to pan/zoom a sub-area within the video frames that is displayed on the display in response to the identified location of the person speaking,
wherein the controller is further configured to identify characteristics of voice accompanying the video frames that is concurrently occurring with the detected movement of the person's mouth, and to correlate the identified voice characteristics with the identified location of the person.

2. The electronic device of claim 1, wherein the controller is further configured to pan the displayed sub-area within a video frame to increase an amount of the person that is viewable on the display in response to the controller determining that a further portion of the person is outside the displayed sub-area but contained elsewhere within the video frame.

3. The electronic device of claim 1, wherein the controller is further configured to zoom-in to enlarge the displayed size of the person's face in a displayed sub-area within the video frames in response to identifying movement of the person's face.

4. The electronic device of claim 1, further comprising a frame buffer that temporarily buffers streaming video frames received by the electronic device from a data network for a sufficient time for the controller to carry-out the pan/zoom within the associated buffered video frames.

5. The electronic device of claim 1, wherein the controller is further configured to detect occurrence of voice in the video frames having the identified voice characteristics of the person and, responsive thereto, to pan the displayed sub-area within the video frames toward the identified location of the person.

6. The electronic device of claim 1, wherein the controller is further configured to detect occurrence of voice in the video frames having the identified voice characteristics of the person and, responsive thereto, to zoom-in to decrease size of a displayed sub-area within the video frames at the identified location of the person and thereby enlarge the displayed person.

7. The electronic device of claim 6, wherein the controller is further configured, after zooming-in, to gradually zoom-out to display increasingly larger sub-areas of the video frames at the location of the person to thereby shrink the displayed person.

8. The electronic device of claim 7, wherein the controller is further configured to gradually zoom-out to display increasingly larger sub-areas of the video frames at the location of the person until another person who the controller has identified as having previously spoke and who is also concurrently contained within the video frames is also displayed.

9. The electronic device of claim 6, wherein the controller is further configured, after zooming-in, to zoom-out to display a larger sub-area or an entire area of the video frames in response to detecting a voice in the video frames that does not correspond to a previously identified person who spoke in the displayed sub-area within the video frames.

10. The electronic device of claim 6, wherein the controller is further configured, after zooming-in, to zoom-out to display a larger sub-area or an entire area of the video frames in response to detecting substantial change in content between at least one of the present video frames and at least one later occurring video frame.

11. The electronic device of claim 1, further comprising a memory containing the video frames, wherein the controller is further configured to discard from the memory at least a substantial portion of data of the video frames that is outside the sub-area within the video frames to be displayed while retaining in the memory data of the video frames that is inside the sub-area within the video frames to be displayed.

12. An electronic device comprising:
a display; and
a controller configured to identify a location within a displayable area of video frames which has movement, and to control panning/zooming of a sub-area within the video frames that is displayed on the display in response to the identified location of the movement,
wherein the controller is further configured to enlarge a sub-area within one of the video frames at a previously identified location of movement in adjacent videoframes to create a displayable thumbnail picture in response to a user of the electronic device commanding stop or pause in the display of the video frames.

13. An electronic device comprising:
a wireless transceiver configured to receive video frames streaming across a wireless network;
a display; and
a controller configured to detect movement of a person's mouth within the video frames while the person is speaking and to identify the associated location of the person speaking, to identify characteristics of voice in the video frames that is concurrently occurring with the detected movement of the person's mouth, to correlate the identified voice characteristics with the identified location of the person speaking, to detect subsequent occurrence of voice in the video frames having the identified voice characteristics of the person and, responsive thereto, to pan a sub-area within the video frames displayed on the display toward the identified location of the person and/or to zoom-in to increase size of the person speaking by decreasing size of a sub-area within the video frames at the location of the speaker that is fit to the display.

* * * * *